United States Patent
Jahner et al.

(10) Patent No.: US 10,686,766 B2
(45) Date of Patent: Jun. 16, 2020

(54) CREDENTIAL MANAGEMENT IN CLOUD-BASED APPLICATION DEPLOYMENT

(71) Applicant: Pivotal Software, Inc., San Francisco, CA (US)

(72) Inventors: Daniel Jahner, Palo Alto, CA (US); Dmitriy Kalinin, Palo Alto, CA (US); Justin Smith, Brooklyn, NY (US)

(73) Assignee: Pivotal Software, Inc., San Francisco, CA (US)

( * ) Notice: Subject to any disclaimer, the term of this patent is extended or adjusted under 35 U.S.C. 154(b) by 194 days.

(21) Appl. No.: 15/704,527

(22) Filed: Sep. 14, 2017

(65) Prior Publication Data

US 2018/0083937 A1 Mar. 22, 2018

Related U.S. Application Data

(60) Provisional application No. 62/396,012, filed on Sep. 16, 2016.

(51) Int. Cl.
*G06F 7/04* (2006.01)
*G06F 15/16* (2006.01)
(Continued)

(52) U.S. Cl.
CPC ............. *H04L 63/06* (2013.01); *G06F 8/60* (2013.01); *G06F 21/31* (2013.01); *G06F 21/45* (2013.01);
(Continued)

(58) Field of Classification Search
USPC ............................................................ 726/6
See application file for complete search history.

(56) References Cited

U.S. PATENT DOCUMENTS

| | | | | |
|---|---|---|---|---|
| 2003/0097579 A1* | 5/2003 | England | ................ | G06F 21/53 713/193 |
| 2012/0266168 A1* | 10/2012 | Spivak | ................ | G06F 9/5055 718/1 |
| 2015/0379259 A1* | 12/2015 | Mohammed | ............ | G06F 21/45 726/6 |

FOREIGN PATENT DOCUMENTS

EP 1526429 4/2005

OTHER PUBLICATIONS

International Search Report and Written Opinion in International Application No. PCT/US2017/051471, dated Jan. 3, 2018, 13 pages.
(Continued)

*Primary Examiner* — Wasika Nipa
*Assistant Examiner* — Samuel Ambaye
(74) *Attorney, Agent, or Firm* — Fish & Richardson P.C.

(57) ABSTRACT

Systems, methods, and computer program products for credential management. An application deployment system receives a deployment manifest for deploying an application in a cloud computing environment. A deployment director of the application deployment system determines a resource to be used by the application. The deployment director determines, from the deployment manifest, an identifier, e.g., a name, of credentials for accessing the resource. The deployment director requests the credentials from a credential manager of the application deployment system. Upon receiving the credentials, the deployment director modifies the deployment manifest by replacing the identifier with the received credentials. The application deployment system deploys the application using the modified deployment manifest and then deletes the modified deployment manifest.

29 Claims, 4 Drawing Sheets

(51) Int. Cl.
    H04L 29/06      (2006.01)
    G06F 21/31      (2013.01)
    H04W 12/00      (2009.01)
    G06F 21/62      (2013.01)
    H04W 12/06      (2009.01)
    G06F 8/60       (2018.01)
    G06F 21/45      (2013.01)

(52) U.S. Cl.
    CPC .......... *G06F 21/6218* (2013.01); *H04L 63/10* (2013.01); *H04W 12/00* (2013.01); *H04W 12/0608* (2019.01); *H04L 63/08* (2013.01)

(56) References Cited

OTHER PUBLICATIONS

PCT International Preliminary Report on Patentability in International Application No. PCT/US2017/051471, dated Mar. 19, 2019, 8 pages.

Unknown author, "Docker—Build, Ship, and Run any App, Anywhere," (Jul. 25, 2016) [online] (retrieved from https://www.docker.comJ), 6 pages.

Unknown author, "GitHub—codahale/sneaker: A Tool for Securely Storing Secrets on S3 Using Amazon KMS," (Jul. 25, 2016) [online] (retrieved from https://github.com/codahale/sneaker), 7 pages.

Unknown author, "Introduction to Vault by HashiCorp," (Jul. 22, 2016) [online] (retrieved from https://www.vaultproject.io/intro/), 4 pages.

Unknown author, "Key Vault—Microsoft Azure," (Jul. 25, 2016) [online] (retrieved from https://azure.microsoft.com/en-us/services/key-vault/), 3 pages.

Unknown author, "Keywhiz—A System for Distributing and Managing Secrets," [Jul. 25, 2016) [online] (retrieved from https://square.github.io/keywhiz/single_page.html), 7 pages.

Unknown author, "Kubernetes—What is Kubernetes?," (Jul. 25, 2016) [online] (retrieved from http://kubernetes.io/docs/whatisk8s/), 6 pages.

Unknown author, "Secrets—Write-up Best Practices, Do's and Don'ts, Roadmap," (Jul. 25, 2016) [online] (retrieved from https://github.com/moby/moby/issues/13490), 29 pages.

* cited by examiner

CREDENTIAL MANAGEMENT IN CLOUD-BASED APPLICATION DEPLOYMENT

CROSS-REFERENCE TO RELATED APPLICATION

This application claims priority to U.S. Provisional Application No. 62/396,012, filed on Sep. 16, 2016. The disclosure of the prior application is considered part of and is incorporated by reference in the disclosure of this application.

BACKGROUND

"Platform-as-a-Service" (commonly referred to as "PaaS") technologies provide an integrated solution that enables a web developer, or an application developer in general, to build, deploy and manage a life cycle of a cloud-based application, e.g., a web application or any other type of networked application. One component of PaaS that supports the cloud-computing platform is a network (e.g., Internet, etc.) infrastructure that is operated and maintained by the service provider upon which developed cloud-based applications may be deployed. The network infrastructure includes hardware resources, e.g., disks or networks, and software resources, e.g., a database program. By providing the hardware and software resources required to run a cloud-based application, the cloud computing platform enables developers to focus on the development of the application itself, rather than the network infrastructure on which the application executes. Accordingly, a developer using PaaS can leave logistics of provisioning and scaling resources, e.g., processing power, facilities, power and bandwidth, data storage, database access, to the cloud computing platform. Some of these resources may be secured resources that require authentication to access. Different resources may require different authentication technologies and different credentials.

SUMMARY

Systems, methods, and computer program products for credential management are described. An application deployment system receives a deployment manifest for deploying an application in a cloud computing environment. A deployment director of the application deployment system determines a resource to be used by the application. The deployment director determines, from the deployment manifest, an identifier, e.g., a name, of credentials for accessing the resource. The deployment director requests the credentials from a credential manager of the application deployment system. Upon receiving the credentials, the deployment director modifies the deployment manifest by replacing the identifier with the received credentials. The application deployment system deploys the application using the modified deployment manifest and then deletes the modified deployment manifest.

In general, one innovative aspect of the subject matter described in this specification can be embodied an application deployment system that includes a credential manager and a deployment director. The credential manager includes one or more computers programmed to perform secret management operations. The secret management operations include receiving, from a first user device, a secret, the secret including a secret name, a secret type, a secret scope, and a secret value; and storing the secret value in a secret database that corresponds to the secret type. The secret value includes one or more credentials, one or more certificates, or one or more security keys. The deployment director includes one or more computers programmed to perform application deployment operations. The application deployment operations include receiving, from a second user device, a deployment manifest for deploying an application on a cloud-based computing platform. The second user device can be the same as the first user device, or different from the first user device. The application deployment operations include identifying, from the deployment manifest, the secret scope and a link to the credential manager, and identifying the secret type and secret name from the deployment manifest, the secret type and secret name being associated with a resource of the cloud-based computing platform. The application deployment operations include submitting, to the credential manager according to the link, a get secret request, the get secret request including the secret scope, secret type and secret name, and receiving, from the credential manager, the secret value corresponding to the secret name in the secret scope, the secret value being retrieved by the credential manager from the secret database corresponding to the secret type. The application deployment operations include modifying the deployment manifest, including replacing the secret name in the deployment with the secret value received from the credential manager. The application deployment operations include deploying the application on a cloud-based computing platform according to the modified deployment manifest, including allowing the application to access the resource of the cloud-based computing platform using the secret value.

In general, one innovative aspect of the subject matter described in this specification can be embodied in methods that include the actions of receiving a deployment manifest for deploying an application in a cloud computing platform. The deployment manifest specifies parameters for provisioning a resource of the cloud computing platform to serve the application. The methods include identifying, from the parameters, one or more secret names associated with the resource; requesting, from a credential manager, a respective secret value for each of the one or more secret names; and modifying the deployment manifest. Modifying the deployment manifest includes replacing each of the one or more secret names in the deployment manifest with a corresponding secret value received from the credential manager. The methods include provisioning the resource for the application using the modified deployment manifest, including creating a service instance for consumption by the application and binding the resource to the service instance using the one or more secret values.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The subject matter described in this specification can be implemented in various embodiments and may result in one or more of the following advantages. For example, the disclosed techniques avoid storing credential information for a deployment as plain text. A deployment of an application can include configuring a virtual machine (VM) in which the application executes to access resources. The resources may require various credentials, certificates or keys to access. By avoiding storing the credentials, certificates or keys on disk, the disclosed techniques provide enhanced security over conventional techniques. For example, in conventional techniques, gaining access to a deployment manifest file can provide full administrative access to an entire deployment. Secrets that are in the deployment manifest file may risk being inadvertently checked into a public system. Avoiding storing the information in the manifest can lowers the risks of unauthorized access and inadvertent disclosure.

The disclosed techniques provide more flexible access control to users. Compared with conventional cloud-based application deployment technologies, where a user who has access to a deployment manifest file has access to all credentials of a deployment, the disclosed techniques can hide credentials of individual resources. The disclosed techniques provide ability to audit credentials. The disclosed techniques can provide an authorization mechanism for credential access, including, for example, a mechanism for auditing who accessed a particular credential at what time, and for building an audit trail for when credentials were last rotated.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
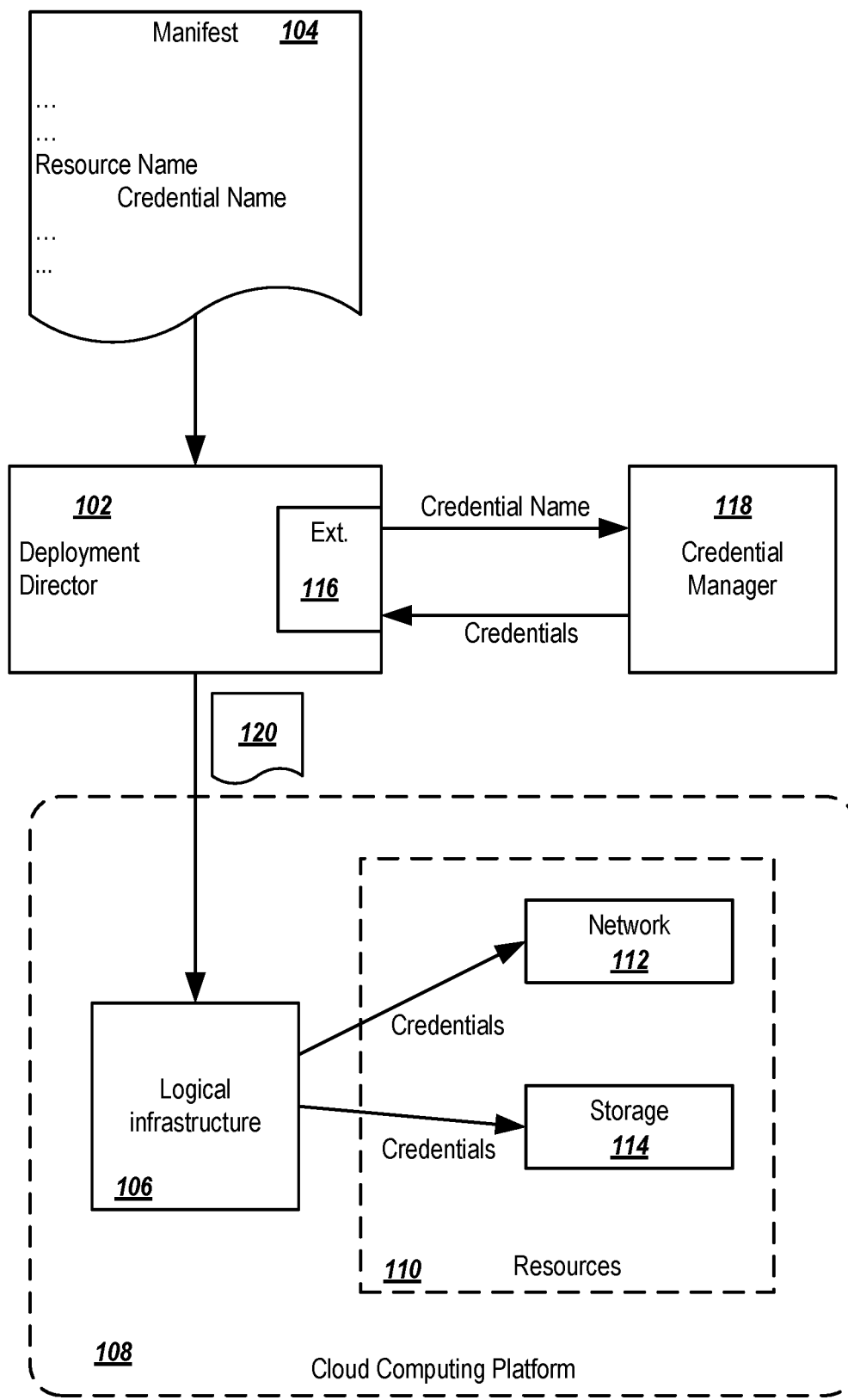
FIG. 1 is a block diagram illustrating example techniques of credential management.

FIG. 1 is a block diagram illustrating example techniques of credential management. A distributed computing system implements the credential managements during application deployment. The application deployment includes provisioning and managing resources on the distributed computing system. A deployment director 102 manages the deployment. The deployment director 102 is a component of the distributed computing system implemented on one or more computers. The software portion of the deployment director 102 can execute in one or more virtual machines on the one or more computers. The deployment director 102 orchestrates a deployment process that provisions and manages the resources.

The deployment director 102 obtains a deployment manifest 104. The deployment manifest 104 include one or more files that describe attributes of desired computing environment such as a number of resource pools (e.g., groups of VMs) to be utilized, networks to be set up, storage devices to allocate, and other settings and functions. The deployment manifest 104 functions as a specification for deploying an application on multiple nodes of the distributed computing platform.

In the example distributing computing system shown, the deployment director 102 generates a logical infrastructure 106 in a cloud computing platform 108. The cloud computing platform 108 includes one or more nodes. Each node can be a physical computer or a VM executing on a physical computer. The logical infrastructure 106 can include one or more VMs in which a cloud-based application is based, and one or more resources 110 used by the VMs.

The one or more resources 110 include computing resources that are allocated to the cloud-based application and virtual computing resources for hosting functional components of the cloud-based application. For example, the one or more resources 110 include network resources 112 and storage resources 114. The network resources 112 include, for example, one or more gateways, routers, or subnets. The storage resources 114 include, for example, one or more network-based disks or database systems. Other resources to be allocated to the cloud-based application can include, for example, a messaging service, a log aggregation service, and an encryption or decryption service.

The deployment manifest 104 includes references to the resources 112 and 114. The references can be, for example, host names, uniform resource identifiers (URIs), IP addresses, port numbers, or various combinations of the above. The deployment manifest 104 specifies secrets for accessing the resources 112 and 114. The secrets can include, for example, credentials, certificates, or security keys. The deployment manifest 104 includes identifiers of the secrets. The identifiers of the secrets are associated with the references to the resources. The identifiers are referred to as secret names. The deployment director 102 includes a credential interface module 116 that extends functions of a conventional deployment director. The credential interface module 116 parses the deployment manifest 104 and identifies secret names from the deployment manifest 104.

The credential interface module 116 then submits the secret names to a credential manager 118. The credential manager 118 can be co-located with an existing service (e.g., a BOSH deployment system running on a VM) or hosted independently in the cloud computing platform 108. Logically, the credential manager 118 is a portion of an application deployment system, which is described in additional detail in reference to FIG. 2. The credential manager 118 provides secret values corresponding to the secret names to the credential interface module 116. The secret values provided by the credential manager 118 can include, for example, credentials, a security certificate, a security key, a pass phrase, or other secure information. The credential interface module 116 can then plug the credentials into the deployment manifest 104. Plugging the credentials into the deployment manifest 104 includes replacing the secret names with the secret values to generate modified manifest 120. The deployment director 102 then creates and configures the logical infrastructure 106 using the modified manifest 120.

Configures the logical infrastructure 106 using the modified manifest 120 includes allowing a cloud-based application running in the logical infrastructure 106 to access the resources 110, including accessing the network resources 112 and storage resources 114. The deployment director 102 can designate a configured logical infrastructure 106, including resources 110 that are bound to the logical infrastructure 106, as a service instance. Additional details on the operations of the deployment director 102 are described below in reference to FIG. 2.

Figure 2:
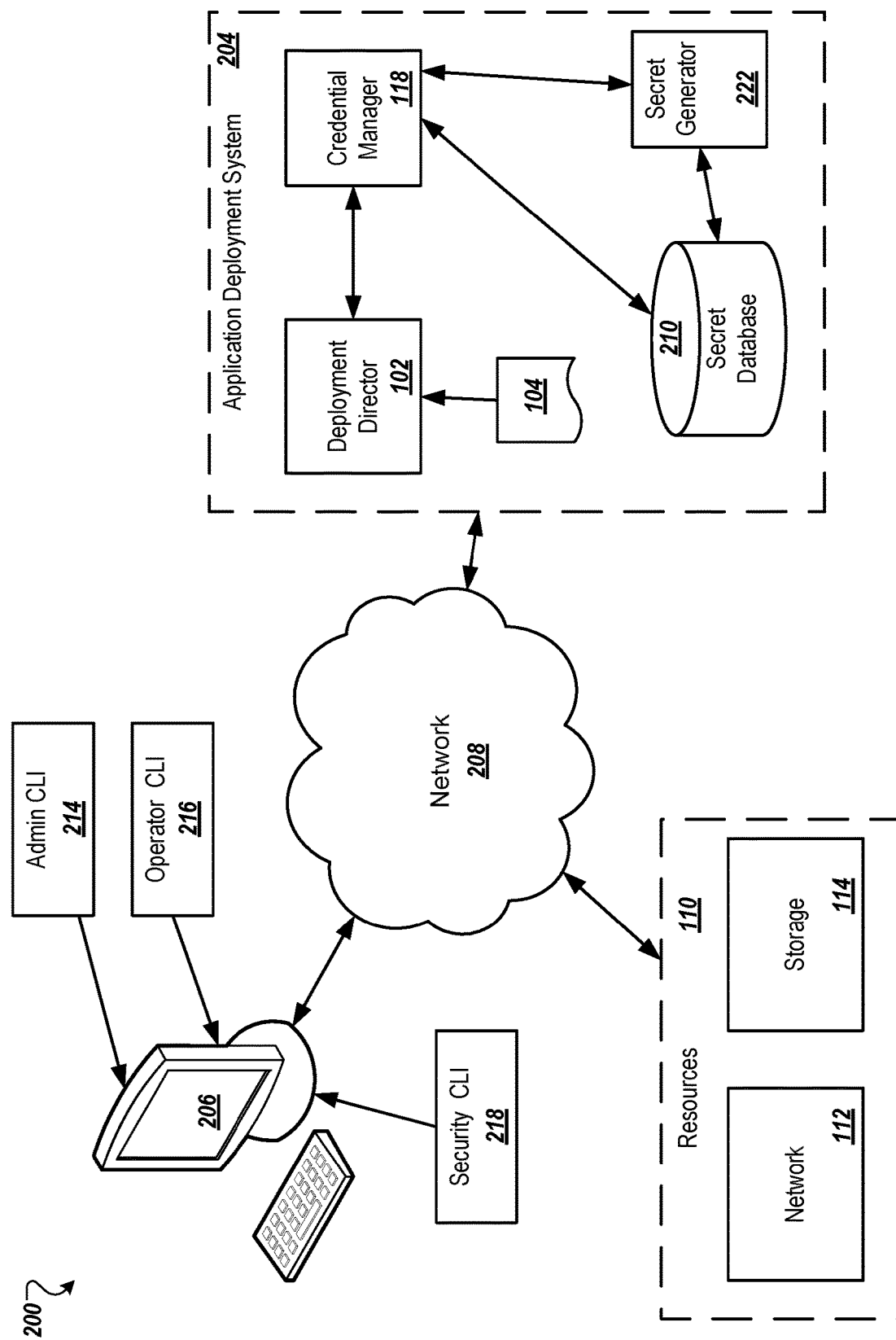
FIG. 2 is a block diagram illustrating an example system implementing credential management.

FIG. 2 is a block diagram illustrating an example system 200 implementing credential management. The system includes an application deployment system 204. The application deployment system 204 can be a release management system, e.g., BOSH, with added functionality of credential management that improves security.

The application deployment system 204 receives a deployment manifest 104 from a user device 206 through a network 208. The user device 206 includes one or more computers configured to be operated by a developer of a cloud-based application, an administrator, or a security engineer. The user device 206 provides the deployment manifest for the cloud-based application. The user device 206 can obtain the deployment manifest 104 by receiving the deployment manifest 104 from a developer, or from a service broker that automatically generates the deployment manifest 104.

The application deployment system 204, which may be a part of a cloud computing platform, may use data in the deployment manifest 104 to automatically provision resources. Provisioning the resources can include creating virtual machines, installing and configuring application packages for execution of an application in the virtual machines, and binding resources to the virtual machines and the application. The deployment manifest 104 may simplify an application deployment process, e.g., for a complex multi-node application that has varying requirements, may enable repeatable and predictable deployments, or both.

The deployment manifest 104 includes references to resources including, for example, networks, resources, and virtual machines. The deployment manifest 104 can specify secrets including credentials, certificates, and security keys using secret names, rather than including the credentials, certificates, and security keys directly. The secret names reference corresponding secret values.

To improve security of the secret values, the application deployment system 204 may receive secret values separately from the deployment manifest 104. The application deployment system 204 may store the secret values separately from data of the deployment manifest 104, e.g., by storing the secret values in a secret database 210. The secret database 210, also referred to as a vault, is a secured database designed for storing secure data. Some examples of the secret database 210 are Hashicorp™ Vault, KeyWiz™, Azure Key Vault™ and Coda Hale Sneaker™.

The application deployment system 204 can receive the secret values through a credentials API or through a user interface. The API includes a "put" method for setting secret values. The secret values can be associated with a secret name. Example credential API method and CLI commands for setting secret values are provided below in Listing 1 and Listing 2.

---
Listing 1: Example API for Setting Secret Values

```
PUT: [host]/[path]/[secret name] {
    "scope": [scope name],
    "secret-type": [secret type],
    "values": {
        "user":[user name],
        "password":[password]
    }
}
```
---

Listing 1 illustrates an example API method for storing secret values using a "put" call. The API method has parameters specifying a host name for storing the secret values, a path for storing the secret values, and a secret name. The API method can also have parameters specifying a scope, e.g., "deployment," in which the secret applies, a secret type, e.g., "static-value" or "SSH," and the secret values. In this example, the secret values include a user name and password. The API allows devices or processes to set secret values programmatically.

The user device 206 can access the functions corresponding to those of the example API method of Listing 1 using a command received through a graphical user interface (GUI), a command line interface (CLI), or a combination of the two. An example of setting secret values using a CLI command is provided below in Listing 2.

---
Listing 2: Example CLI for Setting Secret Values

```
user$ cm set-scope [a scope]
user$ cm set-value --type [secret type] --name [secret name] \
    --values '{"user":[user name],"password":[password]}'
```
---

Listing 2 illustrate example CLI commands for setting secret values. The "user$" in front of each command is an example CLI prompt. A "cm set-scope" command sets the "scope" value in the API of Listing 1. A "cm set-value" command has a parameter "name" for setting the secret name, a parameter "type" for setting a secret type, and a parameter "values" for setting one or more secret values.

A backend command facilitates communication between the credential manager 118 and the secret database 210 for setting secret values. An example backend command invoked by the credential manager 118 is provided below in Listing 3.

---
Listing 3: Example Backend Command for Setting Secret Values

```
user$ vault write [scope]/[secret type]/[secret name] \
    user='[user name]' password='[password]'
```
---

Upon receiving a deployment manifest, a deployment director 102 of the application deployment system 204 parses the deployment manifest, identifies a secret name, and requests, from a credential manager 118, the secret values corresponding to the secret identifier. The credential manager 118 retrieves the secret values through the credential API, e.g., by using a "get" method, from the secret database 210. An example API method for retrieving secret values is provided below in Listing 4.

---
Listing 4: Example API for Getting Secret Values

```
GET: [host]/[ver]/scope/[scope]/type/[secret type]/secret/[secret name]
Response:
    {
        "scope": [scope name],
        "secret-type": [secret type],
        "values": {
            "user":[user name],
            "password":[password]
        }
    }
```
---

Listing 4 illustrate an API where a "get" method for getting secret values. The "get" method can specify a host name, a version number, a scope, a secret type, and a secret name. In response to the "get" method, the credential manager 118 can retrieve the secret values corresponding to the secret name. The example API of Listing 4 allows devices or processes to set secret values programmatically.

The user device 206 can access the functions of the example API method of Listing 4 using a command received through a GUI, a CLI, or a combination of the two. An example of getting secret values using a CLI command is provided below in Listing 5.

---
Listing 5: Example CLI for Setting Secret Values
---
```
user$ cm set-scope [scope]
user$ cm get-value --component cloud-controller --name [secret name]
```
---

Listing 5 illustrate example CLI commands for getting a secret value. A "cm set-scope" command sets the "scope" value in the API of Listing 4. A "cm get-value" command gets "secret-type" and "values" values in the API of listing 4. The parameters of the "cm get-value" command can include a component name and a secret name.

A backend command facilitates communication between the credential manager 118 and the secret database 210 for getting secret values. An example backend command invoked by the credential manager 118 is provided below in Listing 6.

---
Listing 6: Example Backend Command for Setting Secret Values
---
```
user$ vault read -format=json [scope]/[secret type]/[secret name]
Response:
    {
        "lease_id": "",
        "lease_duration": 2592000,
        "renewable": false,
        "data": {
            "password": [a password],
            "user": [a user name]
        },
        "warnings": null
    }
```
---

The backend command can specify a scope, secret type, and a secret name. The secret database 210 can return secret values in a "data" section. The secret database 210 can return an identifier and a duration of the lease on the secret values.

The deployment director 102 can access the credential manager 118 as identified in a deployment manifest 104. The deployment manifest 104 specifies a reference, e.g., an URI, a scope, and optionally, credential manager credentials, e.g., a user name and a password, for accessing the credential manager 118. An example credential manager access section of the deployment manifest 104 is shown below in Listing 7.

---
Listing 7: Example Credential Manager
Section of a Deployment Manifest
---
```
    ...
    credential-manager:
        uri: 10.10.10.10
        scope: [a scope]
    ...
```
---

The deployment director 102, upon receiving a deployment manifest 104, replaces the variables of secrets in the deployment manifest by querying the credential manager 118. The deployment manifest 104 can have a resource section. An example resource section of the deployment manifest 104 is shown below in Listing 8.

---
Listing 8: Example Resource Section of a Deployment Manifest
---
```
    ...
    jobs:
    - name: [a job name]
      properties:
        loggregator_endpoint:
            shared_secret: {{[secret type]/[secret name]}}
        metron_agent:
            zone: [an agent zone]
            deployment: [a deployment name]
        nats:
            user: {{[secret type]/[secret name].user}}
            password: {{[static-value]/[nats-admin].password}}
            port: 4222
            machines:
            - 10.25.161.103
    ......
```
---

In the example of Listing 8, the deployment manifest 104 specifies three resources that will be provisioned to an application: a log aggregator endpoint "loggregator_endpoint," an agent of the log aggregator "metron_agent," and a messaging service "NATS." The resource section specifies various parameters of the resources. Instead of storing the secret value, a "shared_secret" field specifies a secrete name that includes a secret type, e.g., a pass phrase, and a secret name, e.g., "loggregator-shared_secret." The credential manager 118 can provide the secret values. The deployment director 102 replaces the secrete name with a corresponding pass phrase. Likewise, the "nats" field has user name and password subfields. Each subfield can have a corresponding secret, in this example, a user name and a password, respectively. The deployment manifest can have a respective secret variable for each subfield. Each secret variable can have a respective secret type, e.g., "static value," a secret name, e.g., "nats-admin," and a respective subfield of the secret, e.g., "user" and "password." The credential manager 118 can provide the secret values. The deployment director 102 replaces the secrete names with a corresponding user name and password.

The application deployment system 204 can implement multiple graphical or command-line user interface items for various operators. For example, the application deployment system 204 implements administrator CLI 214, operator CLI 216, and security CLI 218. The user device 206, once authenticated, can access the application deployment system 204 through one or more of the administrator CLI 214, operator CLI 216, and security CLI 218 and receive user input through the administrator CLI 214, operator CLI 216, and security CLI 218.

The user device 206 can receive, from an administrator CLI 214, a request to initialize the application deployment system 204. The request can include, for example, a "bosh-init" command with parameters for configuring a BOSH deployment system, parameters for configuring a user account and authentication service (UAA), and parameters for configuring the credential manager 118. The user device 206 receives, from an administrator CLI 214, a command to deploy the credential manager 118. The user device 206 receives, from a CLI for the credential manager 118, a command to initialize a secret backend, e.g., the secret database 210. The user device 206 receives commands for configuring the UAA. The user device 206 receives, from an administrator CLI 214, a command for deploying an application.

Upon receiving each command described above, the application deployment system 204 performs corresponding operations. For example, upon receiving the command for deploying application, the application deployment system 204 configures a service instance according to a deployment manifest. The deployment director 102 authenticates with the credential manager using information in the deployment manifest that references a credential manager, for example, as described above in reference to Listing 7.

The deployment director 102 loops through each of the secret names. For each secrete name, the deployment director 102 requests corresponding secret values. The credential manager 118, upon finding the secret values from the secret database 210, returns the secret values to the deployment director 102. If the credential manager 118 does not find a corresponding secret value, the credential manager 118 can return a secret not found message. In response to the message, the deployment director 102 can request a new secret value from the credential manager 118. The request can include a secret form, e.g., whether the secret is user credentials or a certificate, and type requirement from a service specification file. Upon receiving the request, the credential manager 118 can cause a secret generator 222 to generate one or more secret values accordingly. The secret generator 222 can include a random value generator for generating a random secret value, e.g., a password. The secret generator 222 can provide the generated secret value to the credential manager 118, and store the generated secret value in the secret database 210.

The deployment director 102 then substitutes, in memory, the secrete names in the deployment manifest with the secret values provided by the credential manager 118. The deployment director 102 then executes the deployment operations using the new deployment manifest. The deployment director 102 then discards the new deployment manifest from memory.

An operator can update an existing deployment of an application. The user device 206 can receive a command from an operator CLI 216 to update a deployment manifest. The user device 206 then receives a deployment command, e.g., "bosh deploy." The deployment director 102 can then substitute secret names in the updated deployment manifest as described above, and reconfigure the service instance accordingly.

An operator or a security can change one or more security settings. The user device 206 can receive a command from a security CLI 218. The security CLI 218 can be an interface to the credential manager 118. In response to security key related commands, the credential manager 118 can perform tasks of changing master keys, keys required to unseal, or both. These tasks can include, for example, initiating a re-key of the secret values, setting a threshold of a master key in response to an input, reconfiguring the credential manager 118, setting a new master key. In response to secret related commands, the credential manager 118 can perform tasks of storing new secrets, updating existing secrets, retrieving secrets, or any combination of the above. These tasks can include, for example, setting a secret value, updating a secret value, or retrieving a secret value for external use, e.g., for manually accessing an application or a resource.

In response to a generate new secret command received from the security CLI 218, or through an API call, the credential manager 118 can generate a new secret. Generating the new secret includes authenticating the user or the caller, requesting a random value from the secret generator 222, and setting the secret in the secret database 210 with the generated value.

In response to a credential manager administration command received from the security CLI 218, the credential manager 118 performs various administrative tasks including, for example, audit, backup and restore. For audit, the credential manager 118 can request a security engineer to authenticate with a logging tool that records actions, e.g., additions, updates and removals, performed on secret values, and users and time of the actions. For backup, the credential manager 118 backs up secrets in response to a command, e.g., a CLI command in Listing 9.

| Listing 9: Example CLI Backup Command |
| --- |
| user$ cm backup --encryption-key [an encryption key] [a path and file name] |

In response to the example command in Listing 9, the credential manager 118 backs up secrets in the file specified.

For restore, the credential manager 118 restores secrets from a file in response to a command, e.g., a CLI command in Listing 10.

| Listing 10: Example CLI Restore Command |
| --- |
| user$ cm restore --encryption-key [an encryption key] [a path and file name] |

In response to the example command in Listing 10, the credential manager 118 restores secrets from the file specified.

Figure 3:
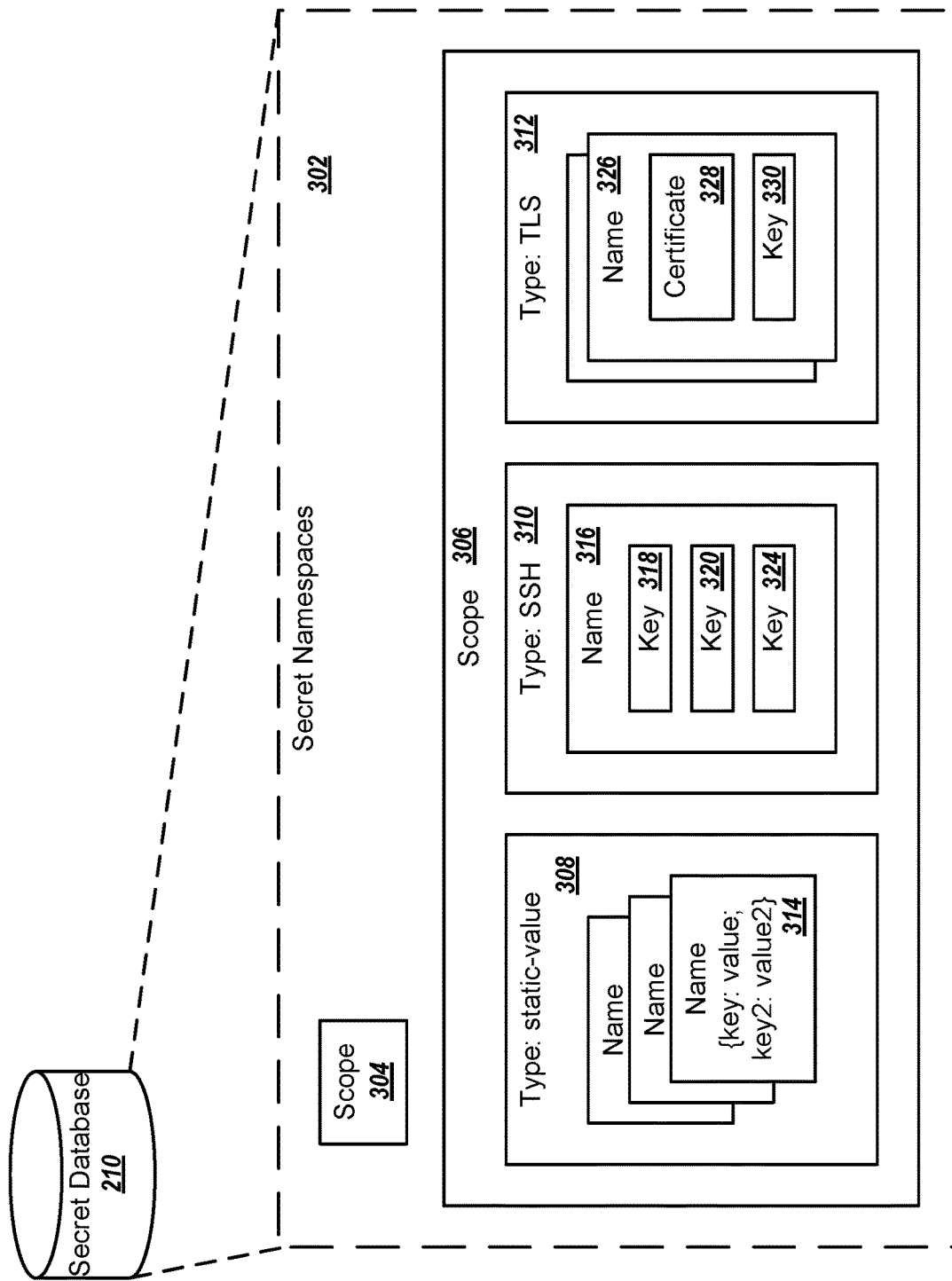
FIG. 3 is a block diagram illustrating example namespaces of secrets stored in a secret database.

FIG. 3 is a block diagram illustrating example namespaces 302 of secrets stored in a secret database 210. As disclosed above, the secrets include secret names and corresponding secret values. Each secret name is in a respective namespace, and is associated with a secret type. A scope that can be an arbitrarily created namespace. Scoping the secret names can avoid collisions of common secret names in the namespaces 302 between systems and system groups.

In the example shown, the namespaces 302 include user defined or system provided scopes 304 and 306. Each of the scopes 304 and 306 has a respective scope name. A secret in the scope 304 and a secret in the scope 306 can have a same name without conflicting with one another.

In each scope, secrets can have various types. For example, in the scope 306, a secret can have a first type 308, e.g., static value, a second type 310, e.g., secure shell (SSH), or a third type 312, e.g., transport layer security (TLS). Only three example types are shown. In various implementations, the scope 306 can include other secret types. Different secret types can correspond to different interactions and supports. For example, for an SSH secret type, the secret database 210 can provision and issue a distinct credential per request. Accordingly, the secret database 210 may differ from a conventional database where data is stored as-is, in that the secret database 210 can include functions of generating secret values. Operations of generating the credentials can be performed by a backend of a vault system. Secret typing can simplify pluggable backends for handling various secrets by restricting only supported types per backend.

In the example shown, secrets in the scope 306 having the static value type 308 includes named key-value pairs. For example, a secret 314 has a secret name and secret values. The secret values of the secret 314 has two key-value pairs. A secret 316 in the scope 306 having the SSH type 310 has a secret name and secret values. The secret values of the secret 316 can have multiple keys, e.g., keys 318, 320, and 324. A secret 326 in the scope 306 having the TLS type 312 has a secret name and secret values. The secret values of the secret 326 can have a certificate 328 and a key 330.

Figure 4:
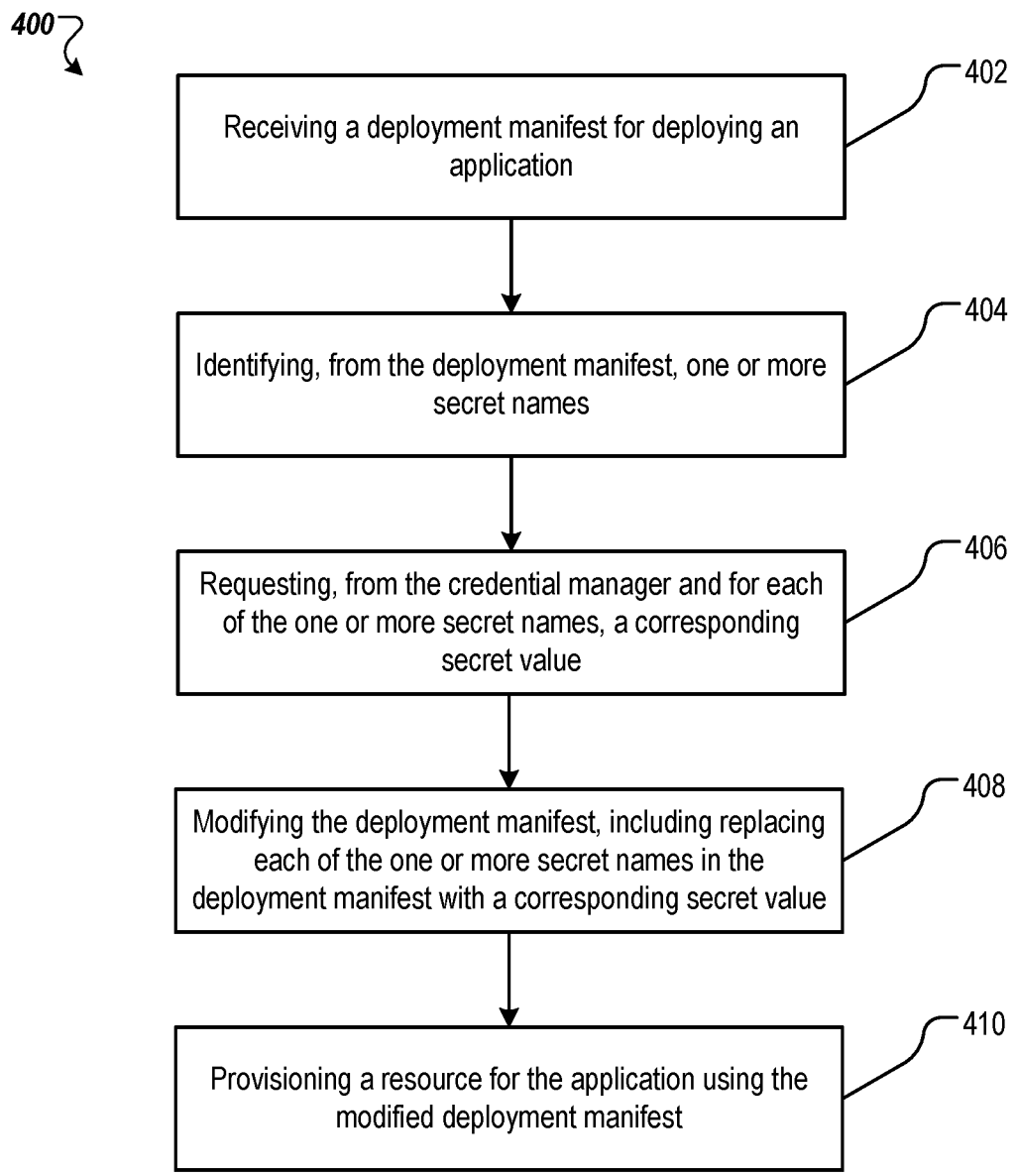
FIG. 4 is a flowchart illustrating an example process of credential management.

FIG. 4 is a flowchart illustrating an example process 400 of credential management. Process 400 can be executed by an application deployment system, e.g., the application deployment system 204 of FIG. 2.

A deployment director of the application deployment system receives (402) a deployment manifest for deploying a cloud-based application in a cloud computing platform. The deployment manifest specifies parameters for provisioning a resource of the cloud computing platform to serve the application. The deployment manifest includes a reference to a credential manager that manages credentials for accessing the resource. The reference can include a link, e.g., a URI, to the credential manager. The reference can include a scope name. The scope name specifies a namespace of the one or more secret names. The resource can include, for example, a network, a messaging system, a node of the cloud computing platform, a storage system, or a routing device.

The deployment director identifies (404), from parameters in the deployment manifest, one or more secret names. The secret names, e.g., user names and passwords, can be embedded in properties of the resource in place of plain text credentials for accessing the resource. In some implementations, in the deployment manifest, each secret name is associated with a respective secret type. The secret type provides a hint to a credential manager, the hint indicating a secret management system handling secrets of the secret type.

The deployment director requests (406), from the credential manager, a respective secret value for each of the one or more secret names. The deployment director receives the respective secret values in response. Each secret value can be stored in a secret database, e.g., the secret database 210 of FIG. 2. The secret database can be populated through a user interface of the credential manager by a set secret commands, or through an application programming interface (API). The secret database stores multiple secrets, each secret having a secret type, a secret scope, a name that matches a secret name in the deployment manifest, and a secret value that includes at least one of a key-value pair, a certificate, or a security key.

In some implementations, the deployment director receives, from the credential manager, a message that indicates that a particular secret name of the one or more secret names does not have a corresponding secret value. In response, the deployment director requests the credential manager to generate a random secret value for the particular secret name.

The deployment director then modifies (408) the deployment manifest. Modifying the deployment manifest includes replacing each of the one or more secret names in the deployment manifest with a corresponding secret value received from the credential manager. In case the secret value is generated by the credential manager, the deployment director replaces the secret name with the generated by the credential manager.

The deployment director provisions (410) the resource for the application using the modified deployment manifest. In provisioning the resource, the deployment director creates a service instance for consumption by the application. The deployment director then binds the resource to the service instance. The service instance can include, for example, a virtual machine in which the application executes. Binding the resource to the service instance can include providing references and credentials for accessing the resource, e.g., addresses and ports of databases, database names, user names and passwords, to the virtual machine. The deployment manifest can be stored on disk. The modified deployment manifest can be stored in memory. The deployment director can delete the modified deployment manifest after the provisioning.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising:
 a credential manager comprising one or more computers, wherein the credential manager is configured to store secret names and respective corresponding secret values, wherein one or more secret values can be used as credentials in order for applications launched on a cloud-based computing platform to access respective resources of the cloud-based computing platform, wherein the credential manager is configured to perform operations comprising:
  receiving, from a first authenticated user device, a secret, the secret including a secret name and a secret value; and
  storing the secret value in a secret database; and a deployment director comprising one or more computers, the deployment director configured to perform operations comprising:
  receiving, from a second user device, a request to deploy an application on the cloud-based computing platform using a deployment manifest having one or more secret names, wherein the application is configured to request access to a resource on the cloud-based computing platform;
  authenticating the second user device;
  in response to authenticating the second user device, identifying, from the deployment manifest, a link to the credential manager;
  identifying the secret name from the deployment manifest, the secret name being associated with a resource of the cloud-based computing platform;
  submitting, to the credential manager according to the link, a get-secret request, the get-secret request including the secret name;
  receiving, from the credential manager, the secret value corresponding to the secret name, the secret value being retrieved by the credential manager from the secret database;
  modifying the original deployment manifest to generate a modified deployment manifest, including adding, to the original deployment manifest, the secret value received from the credential manager associated with the secret name in the original deployment manifest; and
  deploying the application on a cloud-based computing platform according to the modified deployment manifest having the secret value associated by the credential manager with the secret name occurring in the original deployment manifest, including allowing the application to access the resource of the cloud-based computing platform using the secret value as a credential for accessing the resource.

2. The system of claim 1, wherein the secret value includes one or more credentials, one or more certificates, or one or more security keys.

3. A system comprising:
  one or more computers and one or more storage devices on which are stored instructions that are operable, when executed by the one or more computers, to cause the one or more computers to perform operations comprising:
    receiving a deployment manifest for deploying an application in a cloud computing platform, the deployment manifest specifying parameters for provisioning a resource of the cloud computing platform to serve the application;
    identifying, from the parameters, one or more secret names associated with the resource;
    requesting, from a credential manager, a respective secret value for each of the one or more secret names;
    receiving, from the credential manager, a message indicating that a first secret name of the one or more secret names does not have a corresponding secret value;
    providing a request to the credential manager to generate a first secret value for the first secret name;
    modifying the deployment manifest, including replacing the first secret name in the deployment manifest with the first secret value and replacing each of the other secret names in the deployment manifest with a corresponding secret value received from the credential manager, including replacing the first secret name with the first secret value generated by the credential manager; and
    provisioning the resource for the application using the modified deployment manifest, including creating a service instance for consumption by the application and binding the resource to the service instance using the one or more secret values.

4. The system of claim 3, wherein the deployment manifest includes a reference to the credential manager that manages credentials for accessing the resource, the reference comprising a uniform resource identifier (URI) to the credential manager and a scope name, the scope name specifying a namespace of the one or more secret names.

5. The system of claim 3, wherein each secret value is stored in a secret database, the secret database being populated through a user interface of the credential manager by a set secret command, or through an application programming interface (API).

6. The system of claim 5, wherein the secret database stores a plurality of secrets, each secret having a secret type, a secret scope, a name that matches a secret name in the deployment manifest, and a secret value that includes at least one of a key-value pair, a certificate, or a security key.

7. The system of claim 3, wherein the resource is a network, a messaging system, a node of the cloud computing platform, a storage system, or a routing device.

8. The system of claim 3, wherein in the deployment manifest, each secret name is associated with a respective secret type, the secret type providing a hint to the credential manager indicating a secret management system handling secrets of the secret type.

9. The system of claim 3, the operations comprising:
  storing the modified deployment manifest in memory during provisioning the resource; and
  discarding the modified deployment manifest after provisioning the resource.

10. One or more non-transitory computer-readable storage media encoded with computer program instructions that when executed by a distributed system comprising a plurality of computers cause the plurality of computers to perform operations comprising:
  storing, by a credential manager, secret names and respective corresponding secret values, wherein one or more secret values can be used as credentials in order for applications launched on a cloud-based computing platform to access respective resources of the cloud-based computing platform;
  receiving, by the credential manager from a first authenticated user device, a secret, the secret including a secret name and a secret value;
  storing, by the credential manager, the secret value in a secret database;
  receiving, by a deployment director from a second user device, a request to deploy an application on the cloud-based computing platform using a deployment manifest having one or more secret names, wherein the application is configured to request access to a resource on the cloud-based computing platform;
  authenticating, by the deployment director, the second user device;
  in response to authenticating the second user device, identifying, by the deployment director from the deployment manifest, a link to a credential manager;

identifying, by the deployment director, a secret name from the deployment manifest, the secret name being associated with a resource of the cloud-based computing platform;

submitting, by the deployment director to the credential manager according to the link, a get-secret request, the get-secret request including the secret name;

receiving, by the deployment director from the credential manager, a secret value corresponding to the secret name, the secret value being retrieved by the credential manager from a secret database;

modifying, by the deployment director, the original deployment manifest to generate a modified deployment manifest, including adding, to the original deployment manifest, the secret value received from the credential manager associated with the secret name in the original deployment manifest; and deploying, by the deployment director, the application on a cloud-based computing platform according to the modified deployment manifest having the secret value associated by the credential manager with the secret name occurring in the original deployment manifest, including allowing the application to access the resource of the cloud-based computing platform using the secret value as a credential for accessing the resource.

11. The one or more non-transitory computer-readable storage media of claim 10, wherein the secret value includes one or more credentials, one or more certificates, or one or more security keys.

12. The one or more non-transitory computer-readable storage media of claim 10, the operations comprising:

receiving, from a second authenticated user device, a secret, the secret including the secret name and the secret value; and storing the secret value in a secret database.

13. The one or more non-transitory computer-readable storage media of claim 12, the operations comprising:

retrieving the secret value from the secret database.

14. One or more non-transitory computer-readable storage media encoded with computer program instructions that when executed by a distributed system comprising a plurality of computers cause the plurality of computers to perform operations comprising:

receiving a deployment manifest for deploying an application in a cloud computing platform, the deployment manifest specifying parameters for provisioning a resource of the cloud computing platform to serve the application;

identifying, from the parameters, one or more secret names associated with the resource;

requesting, from a credential manager, a respective secret value for each of the one or more secret names;

receiving, from the credential manager, a message indicating that a first secret name of the one or more secret names does not have a corresponding secret value;

providing a request to the credential manager to generate a first secret value for the first secret name;

modifying the deployment manifest, including replacing the first secret name in the deployment manifest with the first secret value and replacing each of the other secret names in the deployment manifest with a corresponding secret value received from the credential manager, including replacing the first secret name with the first secret value generated by the credential manager; and provisioning the resource for the application using the modified deployment manifest, including creating a service instance for consumption by the application and binding the resource to the service instance using the one or more secret values.

15. The one or more non-transitory computer-readable storage media of claim 14, wherein the deployment manifest includes a reference to the credential manager that manages credentials for accessing the resource, the reference comprising a uniform resource identifier (URI) to the credential manager and a scope name, the scope name specifying a namespace of the one or more secret names.

16. The one or more non-transitory computer-readable storage media of claim 14, wherein each secret value is stored in a secret database, the secret database being populated through a user interface of the credential manager by a set secret command, or through an application programming interface (API).

17. The one or more non-transitory computer-readable storage media of claim 16, wherein the secret database stores a plurality of secrets, each secret having a secret type, a secret scope, a name that matches a secret name in the deployment manifest, and a secret value that includes at least one of a key-value pair, a certificate, or a security key.

18. The one or more non-transitory computer-readable storage media of claim 14, wherein the resource is a network, a messaging system, a node of the cloud computing platform, a storage system, or a routing device.

19. The one or more non-transitory computer-readable storage media of claim 14, wherein in the deployment manifest, each secret name is associated with a respective secret type, the secret type providing a hint to the credential manager indicating a secret management system handling secrets of the secret type.

20. The one or more non-transitory computer-readable storage media of claim 14, the operations comprising:

storing the modified deployment manifest in memory during provisioning the resource; and discarding the modified deployment manifest after provisioning the resource.

21. A computer-implemented method comprising:

storing, by a credential manager, secret names and respective corresponding secret values, wherein one or more secret values can be used as credentials in order for applications launched on a cloud-based computing platform to access respective resources of the cloud-based computing platform;

receiving, by the credential manager from a first authenticated user device, a secret, the secret including a secret name and a secret value;

storing, by the credential manager, the secret value in a secret database;

receiving, by a deployment director from a second user device, a request to deploy an application on a cloud-based computing platform using a deployment manifest having one or more secret names, wherein the application is configured to request access to a resource on the cloud-based computing platform;

authenticating, by the deployment director, the second user device;

in response to authenticating the second user device, identifying, by the deployment director from the deployment manifest, a link to a credential manager;

identifying, by the deployment director, a secret name from the deployment manifest, the secret name being associated with a resource of the cloud-based computing platform;

submitting, by the deployment director to the credential manager according to the link, a get-secret request, the get-secret request including the secret name;

receiving, by the deployment director from the credential manager, a secret value corresponding to the secret name, the secret value being retrieved by the credential manager from a secret database;

modifying, by the deployment director, the original deployment manifest to generate a modified deployment manifest, including adding, to the original deployment manifest, the secret value received from the credential manager associated with the secret name in the original deployment manifest; and deploying, by the deployment director, the application on a cloud-based computing platform according to the modified deployment manifest having the secret value associated by the credential manager with the secret name occurring in the original deployment manifest, including allowing the application to access the resource of the cloud-based computing platform using the secret value as a credential for accessing the resource.

22. The method of claim 21, wherein the secret value includes one or more credentials, one or more certificates, or one or more security keys.

23. A computer-implemented method comprising:

receiving a deployment manifest for deploying an application in a cloud computing platform, the deployment manifest specifying parameters for provisioning a resource of the cloud computing platform to serve the application;

identifying, from the parameters, one or more secret names associated with the resource;

requesting, from a credential manager, a respective secret value for each of the one or more secret names;

receiving, from the credential manager, a message indicating that a first secret name of the one or more secret names does not have a corresponding secret value;

providing a request to the credential manager to generate a first secret value for the first secret name;

modifying the deployment manifest, including replacing the first secret name in the deployment manifest with the first secret value and replacing each of the other secret names in the deployment manifest with a corresponding secret value received from the credential manager, including replacing the first secret name with the first secret value generated by the credential manager; and provisioning the resource for the application using the modified deployment manifest, including creating a service instance for consumption by the application and binding the resource to the service instance using the one or more secret values.

24. The method of claim 23, wherein the deployment manifest includes a reference to the credential manager that manages credentials for accessing the resource, the reference comprising a uniform resource identifier (URI) to the credential manager and a scope name, the scope name specifying a namespace of the one or more secret names.

25. The method of claim 23, wherein each secret value is stored in a secret database, the secret database being populated through a user interface of the credential manager by a set secret command, or through an application programming interface (API).

26. The method of claim 25, wherein the secret database stores a plurality of secrets, each secret having a secret type, a secret scope, a name that matches a secret name in the deployment manifest, and a secret value that includes at least one of a key-value pair, a certificate, or a security key.

27. The method of claim 23, wherein the resource is a network, a messaging system, a node of the cloud computing platform, a storage system, or a routing device.

28. The method of claim 23, wherein in the deployment manifest, each secret name is associated with a respective secret type, the secret type providing a hint to the credential manager indicating a secret management system handling secrets of the secret type.

29. The method of claim 23, comprising:

storing the modified deployment manifest in memory during provisioning the resource; and discarding the modified deployment manifest after provisioning the resource.

* * * * *